June 29, 1965  J. BRUNNER ETAL  3,191,434
DEVICE FOR MEASURING TORQUE ON SHAFTS
Filed Nov. 27, 1962

United States Patent Office 3,191,434
Patented June 29, 1965

3,191,434
DEVICE FOR MEASURING TORQUE ON SHAFTS
Julius Brunner and Friedrich Kuhrt, Nurnberg, Germany, assignors to Siemens-Schuckertwerke Aktiengesellschaft, Berlin-Siemensstadt and Erlangen, Germany, a corporation of Germany
Filed Nov. 27, 1962, Ser. No. 240,341
Claims priority, application Germany, Nov. 29, 1961, S 76,903
9 Claims. (Cl. 73—136)

Our invention relates to devices for measuring or sensing torque.

In principle a distinction can be made between digital pulse methods and analog or slight-displacement methods of sensing or measuring torque. The pulse methods require the use of digital counting devices, whereas the devices responsive to slight displacements are capable of directly furnishing an analog measuring value or signal.

Heretofore the means for performing such analog torque measuring methods consisted of strain-gauge strips responsive to elongation, magnetostrictive sensors, and similar components, all of which posed considerable difficulties where great accuracy was required. Therefore such analog methods are of little use in practice despite the simplicity of the gauging principle involved.

It is an object of our invention to provide a torque-responsive gauge or sensor of the slight-displacement type that is capable of furnishing analog signals of high accuracy, particularly with reference to the sensing or measuring of torque on shafts.

We have found that such high accuracy can be attained with relatively simple and reliable electric means by employing a Hall generator under certain constrictional requirements. More specifically, and in accordance with a feature of our invention, we connect a Hall generator, preferably a Hall plate of semiconductor material equipped with the necessary electrodes, to one locality of a shaft or rotor and connect a permanent magnet to another locality of the shaft or rotor axially spaced from that to which the Hall plate is attached. Furthermore, we orient the plane of the Hall plate so that it is located, at least approximately, in an axial plane of the shaft, and we arrange the permanent magnet in front of the Hall plate so that the flux axis of the magnet in the unloaded condition of the shaft is located in the plane of the Hall plate. When under such conditions the Hall plate is electrically energized it furnishes a zero Hall voltage. An output signal, constituted by a Hall voltage occurs when the shaft or rotor is subjected to torque because the position of the Hall-plate plane then departs from the axial plane of the shaft. The polarity and magnitude of the resulting Hall voltage is then an accurate measure of the magnitude and direction of torque.

The torque gauge according to the invention is based upon the following considerations: The torque M acting on a shaft of the radius r produces along the length L of the shaft an angular displacement $$\phi = \frac{2LM}{S\pi r^4}$$

wherein S denotes the modulus of rigidity (shearing modulus) of the shaft material. When two discs of the same radius R are coaxially attached to the respective ends of the shaft portion having the length L under observation, then the relative displacement of respective coordinated points on the peripheries of the two discs is equal to $R \cdot \phi$. The change in Hall voltage occurring in a device according to the invention corresponds to the latter magnitude and is proportional to the torque M.

The foregoing and more specific objects, advantages and features of our invention, said features being set forth with particularity in the claims annexed hereto, will be apparent from, and will de described in, the following with reference to the embodiments of torque-sensing devices according to the invention illustrated by way of example on the accompanying drawing, in which:

Figure 1:
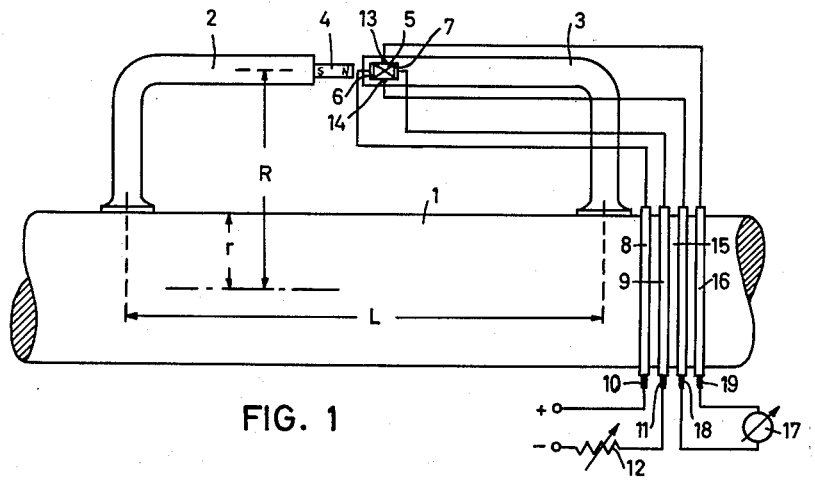
FIG. 1 is a front view of an embodiment of a torque measuring system of the invention.

Shown in FIG. 1 is a portion 1 of a shaft whose radius is denoted by r. Fastened to the shaft are two angular arms 2 and 3 at points longitudinally spaced from each other a distance denoted by L. The arm 2 carries a permanent magnet 4. The arm 3 carries the Hall plate 5 of a Hall generator. The magnet 4 and the Hall plate 5 are located opposite each other at a distance R from the axis of the shaft. The Hall plate 5, consisting for example of indium antimonide or indium arsenide, has the shape of a rectangle and is provided with two current terminals 6 and 7 extending along the respective short sides of the rectangle. Respective probe electrodes, called Hall electrodes, 13 and 14 are located on the two long sides of the rectangle midway between the current terminals. The terminals 6 and 7 of the Hall plate are connected to slip rings 8 or 9 respectively. These slip rings are engaged by respective contact brushes 10, 11 by means of which a current is supplied from a source of direct voltage through the Hall plate 5. An adjustable resistor 12 serves for adjusting the control current. The Hall electrodes 13 and 14 are connected to respective slip rings 15, 16 to which an indicating instrument 17 is connected by mans of contact brushes 18 and 19 engaging the slip rings 15 and 16 respectively. The indicating instrument 17, such as a voltmeter, is preferably calibrated directly in terms of torque. Conventional amplifying means may be interposed between the Hall electrodes and the instrument if desired.

Figure 2:
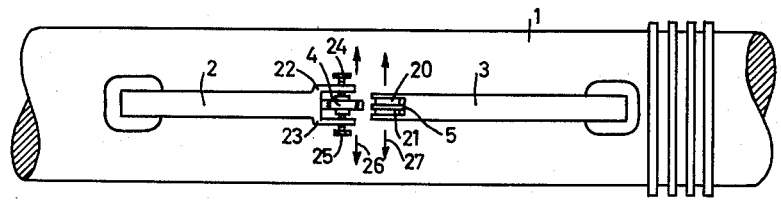
FIG. 2 is a top view of the embodiment of FIG. 1.

As is shown more in detail by the top view according to FIG. 2, the Hall plate 5 is mounted between two pole shoes 20 and 21 of ferrite. The plane of the Hall plate is located in an axial plane of the shaft. The pole shoes of ferrite concentrate the flux of the permanent magnet upon the semiconductor plate and thereby increase the sensitivity of the device. The permanent magnet 4 is so arranged in front of the Hall plate that the flux axis of the magnet in the unloaded condition of the shaft is located in the plane of the semiconductor plate. It is preferable to provide on arm 2 a fork 23, 23 whose legs carry knurled set screws 24, 25 for calibrating the setting of the magnet. This permits calibrating the device when the unloaded shaft is at standstill so that the output signal of the Hall generator is exactly zero. In the zero position the plate is arranged relative to the pole N of the magnet 4 so that the flux lines from pole N to pole S have substantially no perpendicular components relative to and passing through the plane of Hall plate 5.

It is indicated by arrows 26, 27 in FIG. 2 how the Hall plate and the permanent magnet become displaced relative to each other when the shaft is under load. As soon as such displacement takes place, the semiconductor plate is traversed by perpendicular components of the magnetic flux from the permanent magnet and then furnishes a Hall voltage indicated at the instrument 17. With the amounts of displacement realizable in practice, the Hall voltage is accurately proportional to the torque. Instead of employing a measuring instrument 17, any suitable translating device may be used for employing the signal for control or regulating purposes.

Figure 3:
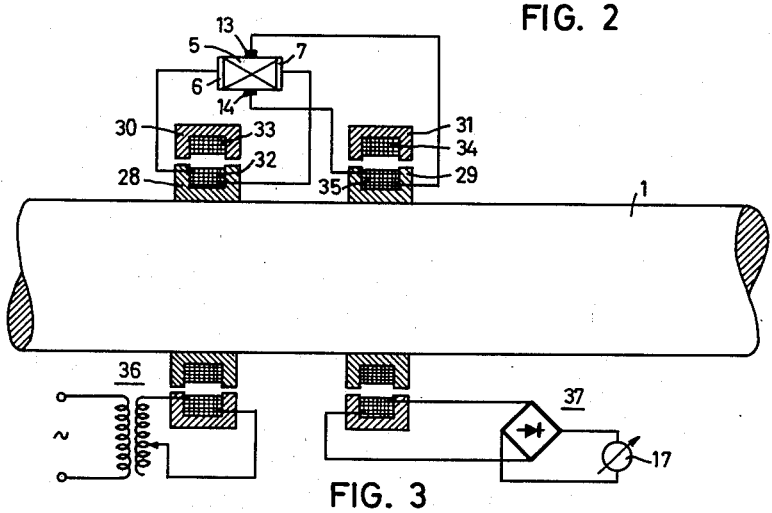
FIG. 3 is a front view, partly in section, of another embodiment of a torque measuring system of the invention.

To avoid falsification of the measurement by spurious influence of the slip rings and contact brushes and to increase the operating reliability, the Hall plate can be supplied with alternating control current with the aid of a rotationally symmetrical transformer, and the Hall voltage can be taken off through another transformer of this type. This is schematically shown in FIG. 3. Each of the two transformers comprises two core members of C-shaped cross section. One core portion 28, 29 is coaxially seated on the shaft and rigidly connected therewith. The other core portion 30, 31 is fixed in space and surrounds the inner core portion with clearance. Both core portions are provided with toroid windings 32, 33 and 34, 35 to operate as primary and secondary windings. The primary winding 33 of the transformer for the control current is connected through an adjustable-voltage transformer 36 to an alternating current line, for example a utility line of 110 or 220 volts and 50 or 60 c.p.s. The secondary winding 34 of the Hall-voltage transformer is connected with the indicating instrument 17. A rectifier 37 may be interposed, as shown. The performance of the device otherwise corresponds to that described above with reference to FIGS. 1 and 2. The two arms 2 and 3 need not consist of magnetic material but can be made of any desired other materials. For example in order to keep the weight of the arms at a minimum, they are preferably made of aluminum. In order to avoid unbalance phenomena at the shaft, two additional arms of the same design can be attached to the shaft in positions 180° displaced from the arms 2 and 3. The additional two arms may also be provided with a permanent magnet and a Hall plate respectively, thus duplicating the above-described arrangement. The two Hall plates can then be supplied with control current either in series or in parallel connection, and the two output voltages can be utilized either independently of each other or also in series connection or parallel connection with each other.

Relative to the design of the fastening means for the permanent magnet and the Hall plate a variety of different means are readily applicable. For example, one of the two arms can be given a straight rather than an angular shape. Furthermore, instead of using arms, respective discs may be used, one disc carrying the Hall generator and the other the permanent magnet. The latter permanent magnet carrying disc may then be connected by a concentric hollow cylinder with a remote shaft locality close to the disc carrying the Hall plate. In any such cases, attention need only be given to observing the essential geometric relations between the axial plane of the shaft, the plane of the semiconductor plate and the flux axis of the permanent magnet as explained in the foregoing.

Devices according to the invention furnish an accurate analog signal indicative of the torque of the shaft regardless of the rotating speed of the shaft and hence also when the shaft is at standstill.

To those skilled in the art it will be obvious, upon a study of this disclosure, that our invention permits of various modifications other than particularly illustrated and described herein, without departing from the essential features of the invention and within the scope of the claims annexed hereto.

We claim:

1. An apparatus for gauging torque upon a shaft having an axis, said apparatus comprising, a magneto-resistive plate positioned substantially in a plane through the axis of said shaft, means for energizing said magneto-resistive plate, a magnet member, first and second holder means for respectively securing said plate and said member to mutually spaced portions along the axis of said shaft and for locating said plate and said member close enough for the magnet member to have a measurable effect upon the magneto-resistive plate, and means for responding to the effect of said magnet plate upon said magneto-resistive member, whereby when the shaft is subjected to torque said last-mentioned means will respond according to the value of the torque.

2. A torque gauge system for a shaft having an axis, said system comprising a Hall plate positioned substantially in a plane through the axis of said shaft, holder means for securing said Hall plate to a portion of said shaft, a magnet, second holder means for securing said magnet to another portion of the shaft axially spaced from said first portion and locating said magnet in the vicinity of said Hall plate, supply means for energizing said Hall plate and electrical means for responding to the effect of said magnet upon said Hall plate, whereby when the shaft is subjected to torque said electrical means will respond according to the value of the torque.

3. A device for gauging the torque of a shaft having an axis, said device comprising a Hall plate positioned substantially in a plane through the axis of said shaft, a magnet, first and second holding means for respectively securing said Hall plate and said magnet to respective axially spaced portions upon said shaft, said first holding means maintaining said Hall plate in said plane through the axis of said shaft, said second holding means maintaining said permanent magnet in the same axial plane and in the vicinity of the Hall plate when said shaft is unloaded, supply means for energizing said Hall plate, and electrical means for responding to the effect of said magnet upon said Hall plate, whereby when torque is applied to the shaft said electrical means will respond according to a value of the applied torque.

4. A device for gauging the torque of a shaft having an axis, said device comprising a Hall plate positioned substantially in a plane through the axis of said shaft, a magnet, first and second holding means for respectively securing said Hall plate and said magnet to respective axially spaced portions upon said shaft, said first holding means maintaining said Hall plate in said plane through the axis of said shaft, said second holding means maintaining said permanent magnet in the same axial plane and in the vicinity of the Hall plate with one pole closer to said Hall plate than the other when said shaft is unloaded, supply means for energizing said Hall plate, and electrical means for responding to the effect of said magnet upon said Hall plate, whereby when torque is applied to the shaft said electrical means will respond according to a value of the applied torque.

5. A device for gauging the torque of a shaft having an axis, said device comprising a Hall plate positioned substantially in a plane through the axis of said shaft, a magnet, first and second holding means for respectively securing said Hall plate and said magnet to respective axially spaced portions upon said shaft, said first holding means maintaining said Hall plate in said plane through the axis of said shaft, said second holding means maintaining said permanent magnet in the same axial plane and in the vicinity of the Hall plate with one pole closer to said Hall plate than the other when said shaft is unloaded, a pair of pole shoes on each side of said Hall plate supported by said first holder means, supply means for energizing said Hall plate, and electrical means for responding to the effect of said magnet upon said Hall plate, whereby when torque is applied to the shaft said electrical means will respond according to a value of the applied torque.

6. A device for gauging the torque of shafts comprising a Hall plate, a magnet, first and second holding means for respectively securing said Hall plate and said magnet to respective axially spaced portions upon a shaft, said first holding means maintaining said Hall plate in an axial plane of said shaft, said second holding means when said shaft is unloaded maintaining said permanent magnet in the same axial plane and in the vicinity of the Hall plate with one pole closer to said Hall plate than the other, supply means for energizing said Hall plate, and electrical means for responding to the effect of said magnet upon said Hall plate, said supply means including a rotationally symmetrical transformer connected to transmit alternating current to said Hall plate, said transformer having a primary winding adapted to be fixed in space and a secondary winding adapted to rotate with said shaft, whereby when torque is applied to the shaft said electrical means will respond according to a value of the applied torque.

7. A device as in claim 6 wherein said electrical means include a rotationally symmetrical transformer connected to transmit Hall voltage from said Hall plate and having a primary winding adapted to rotate with the shaft and a secondary winding adapted to be fixed in space.

8. A device for gauging the torque of a shaft having an axis, said device comprising a Hall plate positioned substantially in a plane through the axis of said shaft, a magnet, first and second holding means for respectively securing said Hall plate and said magnet to respective axially spaced portions upon said shaft, said first holding means maintaining said Hall plate in said plane through the axis of said shaft, said second holding means when said shaft is unloaded maintaining said permanent magnet in the same axial plane and in the vicinity of the Hall plate with one pole closer to said Hall plate than the other, supply means for energizing said Hall plate, and electrical means for responding to the effect of said magnet upon said Hall plate, said supply means and said electrical means each including a slip ring assembly having pairs of ring members and brush members for contacting each ring member, one member in each pair being adapted for rotation with the shaft relative to the other member, whereby when torque is applied to the shaft said electrical means will respond according to a value of the applied torque.

9. A device for gauging the torque of a shaft having an axis, said device comprising a Hall plate, a magnet, first and second holding means for respectively securing said Hall plate and said magnet to respective axially spaced portions upon said shaft, said first holding means maintaining said Hall plate in an axial plane of said shaft, said second holding means when said shaft is unloaded maintaining said permanent magnet in the same axial plane and in the vicinity of the Hall plate with one pole closer to said Hall plate than the other, supply means for energizing said Hall plate, and electrical means for responding to the effect of said magnet upon said Hall plate, said supply means including rotatable power transfer means having a first member and a second member adapted to rotate with the shaft and relative to said first member for transmitting power to said Hall plate from a stationary input, said electrical means including other rotatable transfer means having a first member and a second member adapted to rotate with the shaft and relative to said first member for transmitting the Hall voltage to a stationary output.

References Cited by the Examiner

UNITED STATES PATENTS

| | | | |
|---|---|---|---|
| 2,457,700 | 12/48 | Martin et al. | 73—136 |
| 2,530,022 | 11/50 | Mershon | 73—136 |
| 2,907,897 | 10/59 | Sander | 324—45 |
| 2,987,669 | 6/61 | Kallmann | 324—45 |
| 3,118,108 | 1/64 | Zoss et al. | 73—398 X |

RICHARD C. QUEISSER, *Primary Examiner.*

JOSEPH P. STRIZAK, *Examiner.*